(12) United States Patent
Masui et al.

(10) Patent No.: US 12,204,299 B2
(45) Date of Patent: Jan. 21, 2025

(54) MACHINING CONDITION SEARCHING DEVICE AND MACHINING CONDITION SEARCHING METHOD

(71) Applicant: Mitsubishi Electric Corporation, Tokyo (JP)

(72) Inventors: Hideyuki Masui, Tokyo (JP); Hiroshi Yoshikawa, Tokyo (JP); Jun Maruta, Tokyo (JP); Koki Nakane, Tokyo (JP); Takayuki Nakagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 364 days.

(21) Appl. No.: 17/885,986

(22) Filed: Aug. 11, 2022

(65) Prior Publication Data
US 2022/0382229 A1 Dec. 1, 2022

Related U.S. Application Data

(63) Continuation of application No. PCT/JP2020/011587, filed on Mar. 17, 2020.

(51) Int. Cl.
G05B 13/04 (2006.01)
(52) U.S. Cl.
CPC ......... *G05B 13/048* (2013.01); *G05B 13/042* (2013.01)
(58) Field of Classification Search
CPC .............. G05B 13/042; G05B 13/048; G05B 19/40937; G05B 2219/36289
See application file for complete search history.

(56) References Cited

U.S. PATENT DOCUMENTS

| 2002/0087290 A1* | 7/2002 | Wegerich | G05B 17/02 |
| | | | 702/182 |
| 2009/0204267 A1* | 8/2009 | Sustaeta | G06Q 10/04 |
| | | | 700/36 |

(Continued)

FOREIGN PATENT DOCUMENTS

| JP | 4-99639 A | 3/1992 |
| JP | 5-293741 A | 11/1993 |

(Continued)

OTHER PUBLICATIONS

International Search Report (PCT/ISA/210) isssued in PCT/JP2020/011587, dated Jun. 16, 2020.

*Primary Examiner* — Nicholas Klicos
(74) *Attorney, Agent, or Firm* — Birch, Stewart, Kolasch & Birch, LLP

(57) ABSTRACT

A machining condition searching method includes: generating a machining condition to be set in a machining device; collecting a machining state; collecting the machining result performed under the machining condition; calculating an evaluation value of the machining on the basis of the machining result; constructing an evaluation value prediction model predicting, on the basis of the machining condition, the machining state, and the evaluation value, an evaluation value corresponding to the machining condition that has not been tried; and constructing the evaluation value prediction model on the basis of a change degree in the relationship between the machining condition and the evaluation value, and performs weighting based on the machining state on the evaluation value prediction model. The machining condition to be tried next is generated using a predictive value of the evaluation value. Each of the above processes is repeatedly performed until it is determined to end a search.

7 Claims, 4 Drawing Sheets

(56) References Cited

U.S. PATENT DOCUMENTS

| | | |
|---|---|---|
| 2011/0113303 A1 | 5/2011 | Bedeschi et al. |
| 2015/0379428 A1* | 12/2015 | Dirac .................... G06N 20/00 706/12 |
| 2017/0031329 A1* | 2/2017 | Inagaki ................... B25J 9/163 |
| 2017/0060105 A1 | 3/2017 | Onodera et al. |
| 2017/0308802 A1* | 10/2017 | Ramsøy ................. G06N 20/00 |
| 2018/0196405 A1 | 7/2018 | Maekawa |
| 2019/0041808 A1 | 2/2019 | Hada et al. |
| 2019/0101892 A1 | 4/2019 | Satou et al. |
| 2021/0181754 A1* | 6/2021 | Cui ........................ G06N 3/088 |
| 2022/0107629 A1 | 4/2022 | Masui et al. |

FOREIGN PATENT DOCUMENTS

| | | |
|---|---|---|
| JP | 2011-108354 A | 6/2011 |
| JP | 2012-236267 A | 12/2012 |
| JP | 2015-168104 A | 9/2015 |
| JP | 2017-42882 A | 3/2017 |
| JP | 2017-152492 A | 8/2017 |
| JP | 2018-111145 A | 7/2018 |
| JP | 2019-32649 A | 2/2019 |
| JP | 2019-67137 A | 4/2019 |
| JP | 6639760 B1 | 2/2020 |

\* cited by examiner

MACHINING CONDITION SEARCHING DEVICE AND MACHINING CONDITION SEARCHING METHOD

CROSS REFERENCE TO RELATED APPLICATIONS

This application is a Continuation of PCT International Application No. PCT/JP2020/011587, filed on Mar. 17, 2020, which is hereby expressly incorporated by reference into the present application.

TECHNICAL FIELD

The present disclosure relates to a machining condition searching device and a machining condition searching method for searching for a machining condition.

BACKGROUND ART

Generally, different machining results are obtained depending on machining conditions set in a machining device, and even when the same machining condition is set, different machining results are obtained depending on a change in a machining state indicating the state of the machining device and the state of a workpiece. Therefore, in order to obtain a machining result that satisfies required specifications of machining, it is necessary to search for an appropriate machining condition based on the machining state.

To this end, Patent Literature 1, for example, describes a control device that predicts a machining result of a workpiece by a machining device. This control device predicts an influence of a change in a state quantity on the machining result using a learning model indicating the correlation between a state variable indicating a change in the state quantity that indicates the machining state and determination data indicating the machining result.

CITATION LIST

Patent Literatures

Patent Literature 1: JP 2019-32649 A

SUMMARY OF INVENTION

Technical Problem

When the machining state changes, different machining results are obtained even if the same machining condition is set in the machining device, and the relationship between the machining condition and an evaluation value of machining performed under the machining condition also changes. Therefore, there is a problem that, in order to search for a machining condition that satisfies the required specifications of machining using the control device described in Patent Literature 1, it is necessary to collect a large amount of training data in advance and construct a learning model by which an influence of a change in the machining state on the machining result can be accurately predicted.

The present disclosure addresses the above problem, and an object thereof is to obtain a machining condition searching device and a machining condition searching method with which it is possible to search for a machining condition without constructing a learning model by collecting a large amount of data in advance.

Solution to Problem

A machining condition searching device according to the present disclosure includes: processing circuitry to perform generation of a machining condition to be set in a machining device, to perform collection of a machining state indicating each of a state of the machining device that performs machining in accordance with the machining condition, a state of a workpiece to be machined, and a state of an installation environment of the machining device, to perform collection of a machining result of the machining performed in accordance with the machining condition, to perform calculation of an evaluation value of the machining performed in accordance with the machining condition on a basis of the machining result collected by the collection of the machining result, to perform prediction of the evaluation value corresponding to the machining condition that has not been tried on a basis of the machining condition generated by the generation, the machining state collected by the collection of the machining state, and the evaluation value calculated by the calculation, and to perform construction of the at least one evaluation value prediction model in a case where a degree of change in the machining state is equal to or greater than a threshold value, and perform weighting based on the machining state on the at least one evaluation value prediction model. The processing circuitry generates the machining condition to be tried next, using a predictive value of the evaluation value obtained by the prediction, and the machining condition searching device repeatedly performs each of processes performed by the collection of the machining state, the collection of the machining result, the calculation, the prediction, the construction, and the weighting until searching of the machining condition is determined to end.

Advantageous Effects of Invention

According to the present disclosure, the evaluation value corresponding to the machining condition that has not been tried is predicted on the basis of the machining condition set in the machining device, the machining state, and the evaluation value of machining, the evaluation value prediction model is constructed on the basis of a degree of change in the relationship between the machining condition and the evaluation value, and weighting based on the machining state is performed on the evaluation value prediction model. Even when the relationship between the machining condition and the evaluation value changes due to a change in the machining state, the evaluation value prediction model is newly constructed on the basis of the degree of the change, and weighting based on the machining state is performed on the evaluation value prediction model. Thus, the machining condition searching device according to the present disclosure can search for a machining condition without constructing a learning model by collecting a large amount of data in advance.

DESCRIPTION OF EMBODIMENTS

First Embodiment

Figure 1:
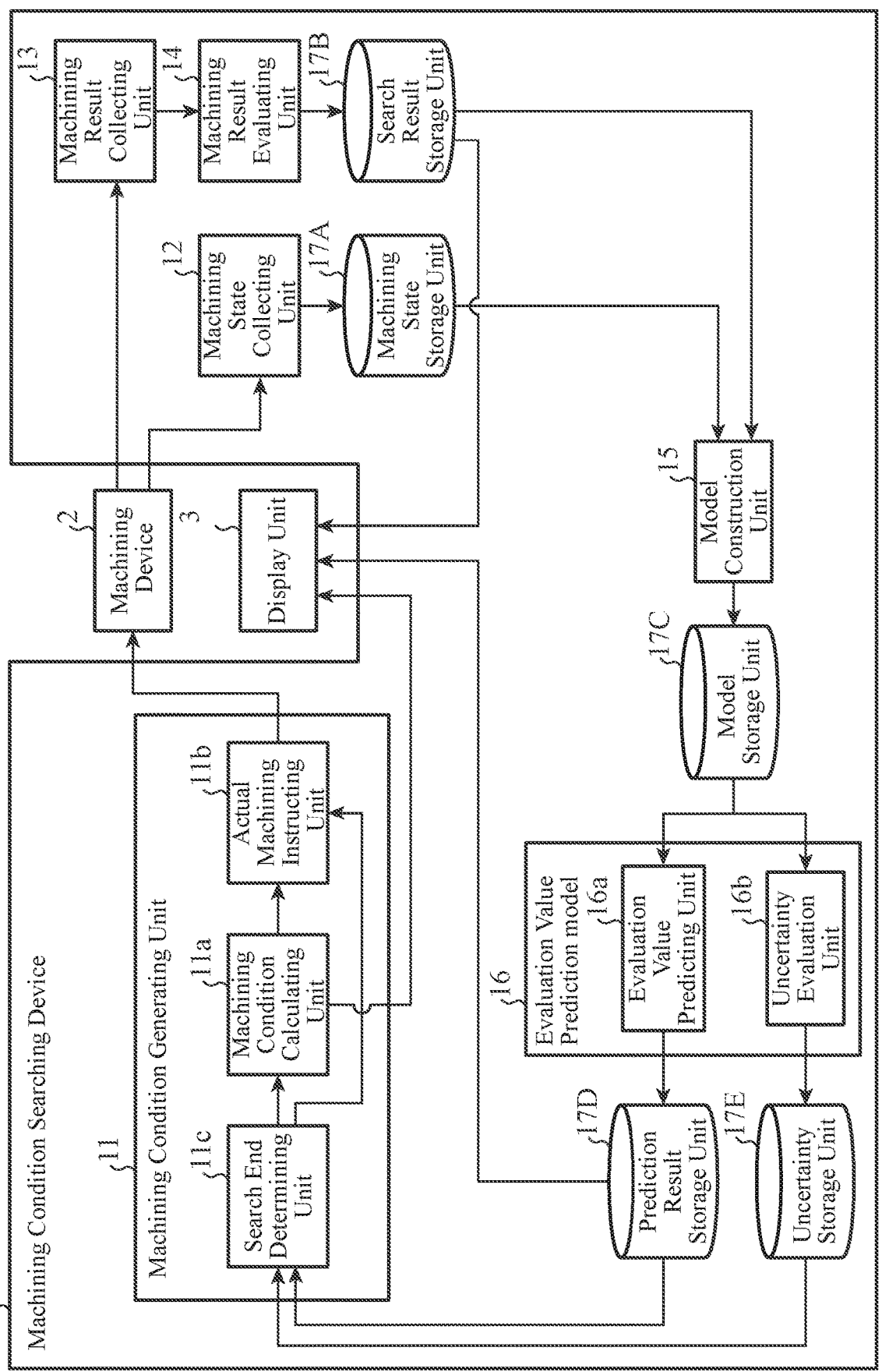
FIG. 1 is a block diagram illustrating a configuration of a machining condition searching device according to a first embodiment.

FIG. 1 is a block diagram illustrating the configuration of a machining condition searching device 1 according to the first embodiment. The machining condition searching device 1 searches for an optimal machining condition from a large number of machining conditions that can be set in a machining device 2, and sets the machining condition resulting from the search in the machining device 2. The optimal machining condition is, for example, a machining condition under which a machining result satisfying required machining specifications is obtained. In addition, a display unit 3 displays the machining condition searched by the machining condition searching device 1, etc. For example, the display unit 3 displays a machining condition set in the machining device 2 and an evaluation value of machining performed by the machining device 2 in accordance with the machining condition.

The machining device 2 is an industrial device that performs machining in accordance with a machining condition, and machines a workpiece made of metal into a desired shape by, for example, cutting or polishing the workpiece or removing unnecessary portions using electricity or other energy. The workpiece is not limited to metal, and may be ceramics, glass, or wood. Examples of the machining device 2 include a laser beam machine, an electrical discharge machine, a cutting machine, a grinding machine, an electro-chemical machine, an ultrasonic machining device, and an electron beam machine. An example in which the machining device 2 is an electrical discharge machine, particularly a die sinking electrical discharge machine, will be described below.

The machining condition is constructed by a combination of a plurality of control parameters used to control the machining device 2. Generally, different machining conditions result in different machining results. In addition, even if the same machining condition is set in the machining device 2, different machining results may be obtained depending on a change in the machining state that indicates a state of the machining device 2 which is performing machining, a state of the workpiece that is being machined, and a state of an installation environment of the machining device 2. That is, in order to obtain an optimal machining result satisfying required machining specifications, it is necessary to search for an appropriate machining condition based on the machining state.

For example, in a case where there are three control parameters that can be adjusted in machining by a die sinking electrical discharge machine, and the value of each control parameter can be selected on a scale of 1 to 10, there are $10^3=1000$ machining conditions constituted by a combination of the control parameters. For this, the machining condition searching device 1 does not sequentially search for a large number of machining conditions that can be set in the machining device 2, but narrows down the number of machining conditions to be searched depending on a change in the machining state, so that the number of attempts to search for machining conditions is reduced.

In FIG. 1, the machining condition searching device 1 includes a machining condition generating unit 11, a machining state collecting unit 12, a machining result collecting unit 13, a machining result evaluating unit 14, a model construction unit 15, and an evaluation value prediction model 16. The machining condition searching device 1 also includes a machining state storage unit 17A, a search result storage unit 17B, a model storage unit 17C, a prediction result storage unit 17D, and an uncertainty storage unit 17E. All or some of the storage units 17A to 17E may be provided in an external device provided separately from the machining condition searching device 1.

The machining condition generating unit 11 generates a machining condition and sets the generated machining condition in the machining device 2. The machining condition generating unit 11 includes a machining condition calculating unit 11a, an actual machining instructing unit 11b, and a search end determining unit 11c.

The machining condition calculating unit 11a calculates a machining condition to be set in the machining device 2. For example, the machining condition calculating unit 11a selects, from combinations of a plurality of control parameters of the machining device 2 and possible values of these control parameters, a combination corresponding to the machining detail and calculates the machining condition from the selected combination. The control parameters are, for example, laser output, cutting speed, beam magnification, focal position, and gas pressure.

The actual machining instructing unit 11b causes the machining device 2 to perform machining based on the machining condition calculated by the machining condition calculating unit 11a. For example, the actual machining instructing unit 11b generates an instruction for operating the machining device 2 on the basis of the machining condition calculated by the machining condition calculating unit 11a, and outputs the generated instruction to the machining device 2.

The search end determining unit 11c determines whether or not to end the search for the machining condition on the basis of data stored in the prediction result storage unit 17D or the uncertainty storage unit 17E. When the search end determining unit 11c determines that it is necessary to additionally search for machining conditions, the machining condition calculating unit 11a generates a machining condition under which machining is to be performed next. When it is determined that it is not necessary to additionally search for machining conditions, the machining condition calculating unit 11a determines the machining condition predicted to have the highest evaluation value as an optimal machining condition using the prediction result of the evaluation value stored in the prediction result storage unit 17D.

The machining state collecting unit 12 collects data indicating a machining state of machining performed by the machining device 2. The machining state includes a state of the machining device 2, a state of the workpiece being machined, and a state of an installation environment of the machining device 2. For example, the machining state indicates a state that affects the machining result but cannot be controlled by a user, such as the temperature of the machining device 2, the temperature of the workpiece, the thickness of the workpiece, and the temperature or humidity in a room that is the installation environment of the machining device 2. The data indicating the machining state indicates a state quantity obtained by quantifying each state indicated by the machining state. The data collected by the machining state collecting unit 12 is stored in the machining state storage unit 17A.

The machining result collecting unit 13 collects, from the machining device 2, a machining result of the machining performed in accordance with the machining condition. For example, the machining result collecting unit 13 collects information related to the machining obtained during and after the machining. Examples of the information related to the machining include detection data of sound or light observed during machining, the number of discharge pulses, and the surface state of the workpiece after machining.

The machining result evaluating unit 14 calculates an evaluation value of the machining performed by the machining device 2 in accordance with the machining condition on the basis of the machining result collected by the machining result collecting unit 13. The evaluation value indicates the quality of machining, and is, for example, a value falls within the range from 0 to 1. The larger the evaluation value is, the better the machining result is. The evaluation value is 1 when the best machining is performed, and the evaluation value is 0 when the worst machining is performed. The machining result evaluating unit 14 stores a combination of the machining condition and the evaluation value in the search result storage unit 17B as a search result. The search result storage unit 17B stores the search result.

The model construction unit 15 constructs the evaluation value prediction model 16 on the basis of a degree of change in the relationship between the machining condition and the evaluation value, and performs weighting based on the machining state on the evaluation value prediction model 16. For example, the model construction unit 15 calculates a degree of change in the relationship between the machining condition and the evaluation value on the basis of the information indicating the machining state stored in the machining state storage unit 17A and the evaluation value stored in the search result storage unit 17B. When the degree of change in the relationship between the machining condition and the evaluation value is equal to or greater than a threshold value, the model construction unit 15 determines that a change in the machining state for newly constructing the evaluation value prediction model has occurred, and constructs the evaluation value prediction model.

In addition, the model construction unit 15 performs weighting on the evaluation value prediction model 16 on the basis of the machining state. For example, the predictive values of the evaluation values respectively obtained by a plurality of evaluation value prediction models 16 are integrated using weights corresponding to the magnitudes of state quantities obtained by quantifying the machining states corresponding to the evaluation value prediction models 16. In the integrated predictive value of the evaluation value, the prediction result of the evaluation value prediction model 16 having a larger weight is considered more important.

The evaluation value prediction model 16 predicts an evaluation value corresponding to an untried machining condition on the basis of the machining condition generated by the machining condition generating unit 11, the machining state collected by the machining state collecting unit 12, and the evaluation value calculated by the machining result evaluating unit 14. In FIG. 1, the evaluation value prediction model 16 includes an evaluation value predicting unit 16a and an uncertainty evaluation unit 16b.

The evaluation value predicting unit 16a predicts an evaluation value corresponding to an untried machining condition (under which machining is not performed) on the basis of the machining condition stored in the search result storage unit 17B and the evaluation value corresponding to this machining condition. In addition, the evaluation value predicting unit 16a stores the machining condition and a predictive value of the evaluation value corresponding to this machining condition in the prediction result storage unit 17D. The prediction result storage unit 17D stores an untried machining condition and a predictive value of an evaluation value corresponding to the untried machining condition in association with each other.

The uncertainty evaluation unit 16b calculates an index indicating uncertainty of the prediction of the evaluation value by the evaluation value predicting unit 16a. For example, the uncertainty evaluation unit 16b calculates an index indicating uncertainty of the predictive value of the evaluation value, that is, the likelihood of deviation from the prediction, using the search result stored in the search result storage unit 17B. The uncertainty evaluation unit 16b stores uncertainty information including the calculated index value and the machining condition in the uncertainty storage unit 17E. The uncertainty storage unit 17E stores the untried machining condition and an index value indicating the uncertainty of prediction of the evaluation value corresponding to the untried machining condition in association with each other.

Figure 2:
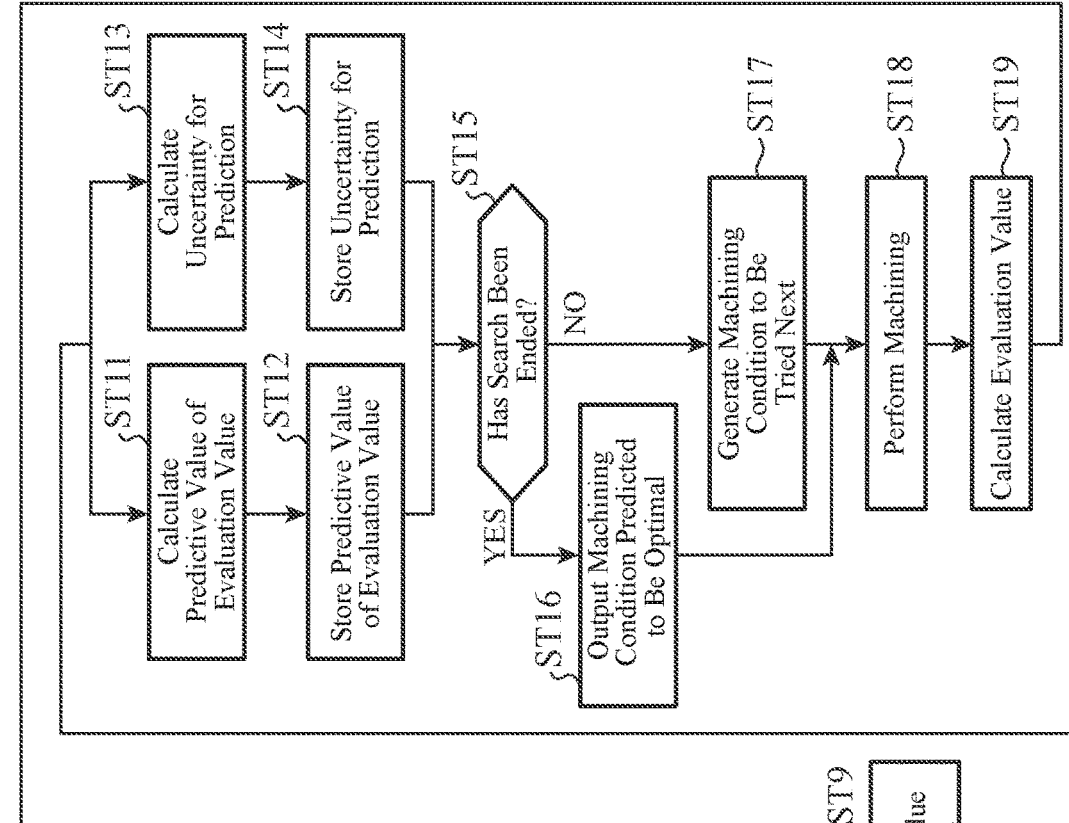
FIG. 2 is a flowchart illustrating a machining condition searching method according to the first embodiment.
Figure 2:
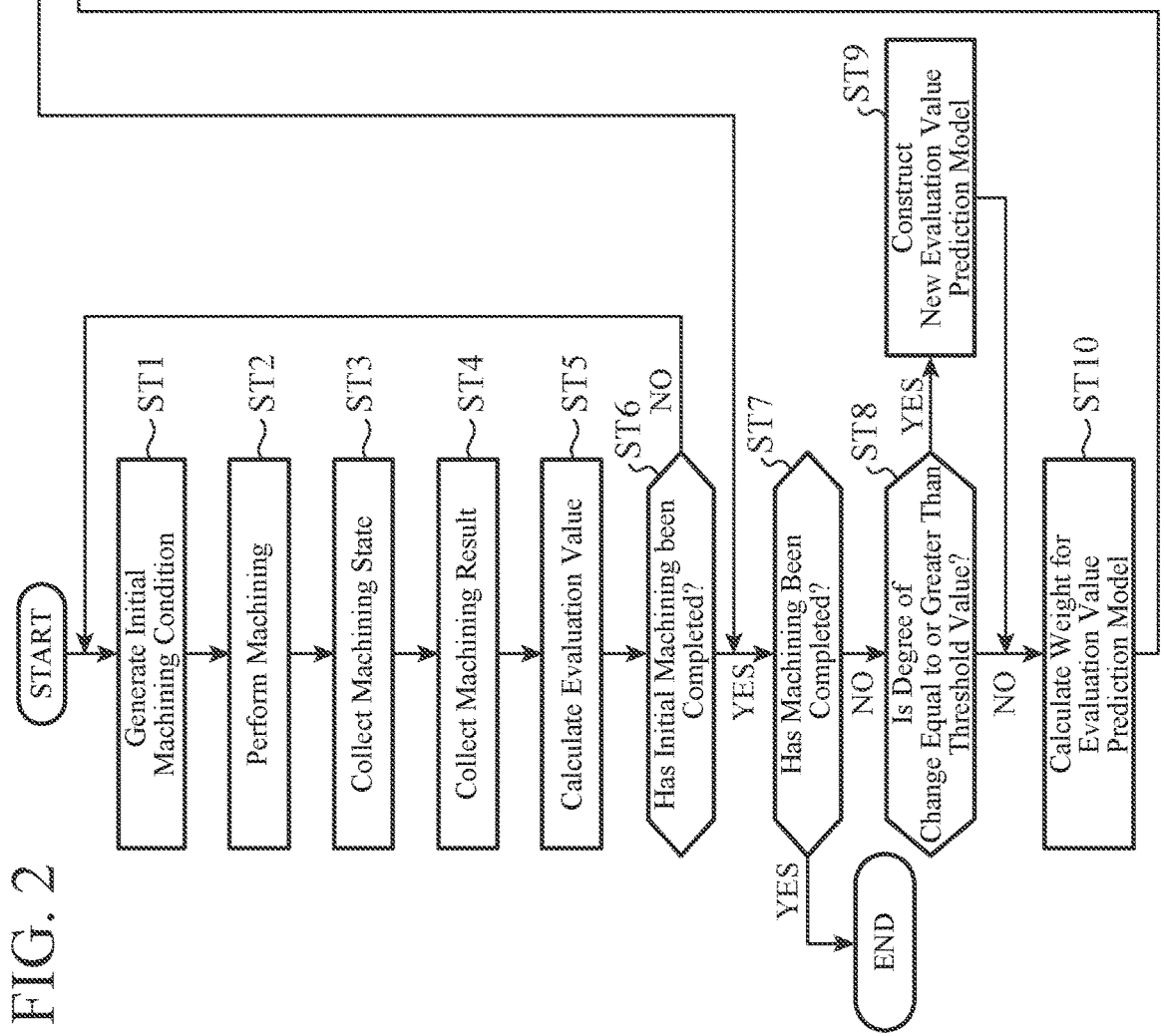

FIG. 2 is a flowchart illustrating the machining condition searching method according to the first embodiment, and illustrates a series of processing until an optimal machining condition is found by the machining condition searching device 1. When the processing for searching for an optimal machining condition is started, the machining condition generating unit 11 generates an initial machining condition (step ST1). The machining condition calculating unit 11a selects a certain number of combinations as initial machining conditions from among all combinations of control parameters that can be set in the machining device 2. As a method for selecting the initial machining condition, an experimental design method, an optimal design method, and random sampling may be used. When the user has an idea of the optimal machining condition on the basis of the past usage record of the machining device 2, the machining condition designated by the user may be used as the initial machining condition.

For example, when there are three control parameters constituting the machining condition, and a value to be set in the machining device 2 is selected from 10 values for each control parameter, the total number of combinations of the machining conditions is 1000. The machining condition calculating unit 11a selects a certain number of machining conditions from 1000 machining conditions. In the following description, the certain number is, for example, five, and the machining condition calculating unit 11a selects five machining conditions from 1000 machining conditions.

Subsequently, the machining condition generating unit 11 sets the initial machining conditions in the machining device 2 and causes the machining device 2 to perform machining in accordance with the initial machining conditions (step ST2). For example, the machining condition calculating unit 11a selects one initial machining condition from among five initial machining conditions, and outputs the selected initial machining condition to the actual machining instructing unit 11b. The actual machining instructing unit 11b generates an instruction for operating the machining device 2 on the basis of the initial machining condition output from the machining condition calculating unit 11a, and outputs the generated instruction to the machining device 2. The machining device 2 performs machining in accordance with the initial machining condition. In the following description, machining in accordance with the initial machining condition is also referred to as "initial machining".

The machining state collecting unit 12 collects data indicating a machining state of the machining performed by the machining device 2 in accordance with the initial machining condition (step ST3). The machining state collecting unit 12 stores the data indicating the machining state collected from the machining device 2 in the machining state storage unit 17A. As a result, the machining state storage unit 17A stores the initial machining condition and the machining state in association with each other.

The machining result collecting unit 13 collects data indicating a machining result of the machining performed by the machining device 2 in accordance with the initial machining condition (step ST4). The data collected by the machining result collecting unit 13 is output to the machining result evaluating unit 14.

The machining result evaluating unit 14 calculates an evaluation value of the machining performed by the machining device 2 in accordance with the initial machining condition on the basis of the machining result collected by the machining result collecting unit 13 (step ST5). The machining result evaluating unit 14 calculates an evaluation value indicating the quality of machining by quantifying the machining result collected by the machining result collecting unit 13. For example, the machining result evaluating unit 14 measures detection data of sound or light or the number of discharge pulses observed during machining in accordance with the initial machining condition, and converts the measured value into an evaluation value indicating the quality of machining, the evaluation value being a continuous value or a discrete value of a plurality of levels (for example, 10 levels). The search result storage unit 17B stores a combination of the machining condition and the evaluation value.

The machining condition calculating unit 11a checks whether or not initial machining has been completed for all the machining conditions selected as the initial machining conditions (step ST6). When there is an initial machining condition under which initial machining has not been completed (NO in step ST6), the processes from step ST1 to step ST5 are sequentially performed for the initial machining condition under which the initial machining has not been completed. As a result, all the initial machining conditions (for example, five initial machining conditions) and the data indicating machining states are stored in the machining state storage unit 17A in association with each other. Further, the search result storage unit 17B stores all the initial machining conditions and the evaluation values in association with each other.

When the initial machining under all the initial machining conditions has been completed (YES in step ST6), the machining condition calculating unit 11a checks whether or not machining in accordance with the optimal machining condition resulting from the search has been completed (step ST7). When the machining device 2 completes machining in accordance with the optimal machining condition (YES in step ST7), the series of processes in FIG. 2 ends.

When machining in accordance with the optimal machining condition has not been completed (NO in step ST7), the model construction unit 15 determines whether or not the value of an index indicating a degree of change in the relationship between the machining condition and the evaluation value is equal to or greater than the threshold value using the data indicating the machining state stored in the machining state storage unit 17A (step ST8). A method for obtaining the degree of change includes change point detection. The change point detection uses an abnormality degree as an index indicating the degree of change. The abnormality degree is, for example, a value obtained by squaring a difference between a predictive value of the machining state and an actual measurement value of the machining state stored in the machining state storage unit 17A.

For example, an autoregressive model is used to calculate the predictive value of the machining state. In the autoregressive model, the predictive value hat y(t) of the machining state at a time t that is one step ahead is calculated using Equation (1) below. In Equation (1) below, y(t−1) is an actual measurement value of the machining state at a current time t−1, y(t−2) is an actual measurement value of the machining state at a past time t−2, and y(t−3) is an actual measurement value of the machining state at a past time t−3. The coefficient $\alpha 1$ is a coefficient for the actual measurement value y(t−1), the coefficient $\alpha 2$ is a coefficient for the actual measurement value y(t−2), and the coefficient $\alpha 3$ is a coefficient for the actual measurement value y(t−3). Note that the model construction unit 15 may evaluate the degree of change in the relationship between the machining condition and the evaluation value using supervised learning such as a multiple regression model, a decision tree, or a neural network in place of the autoregressive model.

$$\hat{y}(t) = \alpha_1 y(t-1) + \alpha_2 y(t-2) + \alpha_3 y(t-3) \tag{1}$$

When determining that the value of the index indicating the degree of change in the relationship between the machining condition and the evaluation value is equal to or greater than the threshold value (YES in step ST8), the model construction unit 15 determines that a change in the machining state for which the evaluation value prediction model 16 is to be newly constructed has occurred, and constructs the evaluation value prediction model 16 corresponding to the changed machining state (step ST9). The evaluation value prediction model 16 can be constructed using supervised learning such as an autoregressive model, a multiple regression model, a decision tree, or a neural network, for example.

When the model construction unit 15 determines that the value of the index indicating the degree of change in the relationship between the machining condition and the evaluation value is less than the threshold value (NO in step ST8) or when the process of ST9 is completed, the model construction unit 15 performs weighting based on the machining state stored in the machining state storage unit 17A on each of the already constructed evaluation value prediction models 16 (step ST10). The method for weighting includes linear interpolation and boosting. In addition, the model construction unit 15 may select one evaluation value prediction model 16 and perform weighting on the selected evaluation value prediction model 16 instead of performing weighting on the plurality of evaluation value prediction models 16.

For example, the model construction unit 15 performs weighting on the evaluation value prediction model 16 using linear interpolation. The model construction unit 15 calculates, using a machining state s1 at the past time t−2 and a machining state s2 at the past time t−3 which are stored in the machining state storage unit 17A, and a machining state s at the current time t−1 collected by the machining state collecting unit 12, a weight $\gamma 1(s)$ for a function f1 determined by the evaluation value prediction model 16 corresponding to the machining state s1 and a weight $\beta 2(s)$ for a function f2 determined by the evaluation value prediction model 16 corresponding to the machining state s2 in accordance with Equation (2) below. An output f(x, s) of the evaluation value prediction model 16 for the machining condition x and the machining state s is calculated in accordance with Equation (3) below using the weights. Note that, although the weight values are determined for the two evaluation value prediction models 16, the model construction unit 15 may calculate the weight values for three or more evaluation value prediction models 16.

$$\beta1(s)=(s2-s)/(s2-s1)$$

$$\beta2(s)=(s-s1)/(s2-s1) \quad (2)$$

$$f(x,s)=\beta1(s)f1(x)+\beta2(s)f2(x) \quad (3)$$

When machining in accordance with, for example, the five initial machining conditions is completed, the evaluation value predicting unit 16a in the evaluation value prediction model 16 predicts, using the machining conditions stored in the search result storage unit 17B and the evaluation values corresponding thereto, evaluation values for all of the 1000 machining conditions described above (step ST11). The evaluation values predicted by the evaluation value predicting unit 16a are stored in the prediction result storage unit 17D (step ST12).

As a method for predicting the evaluation value by the evaluation value predicting unit 16a, Gaussian process regression may be used, for example. In the Gaussian process regression, the evaluation value predicting unit 16a is a probability model of the machining condition corresponding to the evaluation value constructed assuming that the evaluation value corresponding to the machining condition is a random variable. When a vector in which the machining conditions stored in the search result storage unit 17B and kernel values corresponding thereto are arranged is k and a vector in which the evaluation values stored in the search result storage unit 17B are arranged is t, the evaluation value predicting unit 16a can calculate a predictive value m(x) of the evaluation value for the machining condition x in accordance with Equation (4) below. In Equation (4), $C_N$ is a gram matrix. Note that the evaluation value predicting unit 16a may not use Gaussian process regression, and may predict the evaluation value using supervised learning such as a decision tree, linear regression, boosting, or a neural network.

$$m(x)=k^T \cdot (C_N^{-1}) \cdot t \quad (4)$$

When machining in accordance with, for example, the five initial machining conditions is completed, the uncertainty evaluation unit 16b in the evaluation value prediction model 16 calculates indexes indicating uncertainty of prediction of the evaluation values for all of the 1000 machining conditions described above using the machining conditions stored in the search result storage unit 17B and the evaluation values corresponding thereto (step ST13). The values of the indexes calculated by the uncertainty evaluation unit 16b are stored in the uncertainty storage unit 17E (step ST14).

As a method for calculating the indexes by the uncertainty evaluation unit 16b, Gaussian process regression is used, for example. In the Gaussian process regression, when a vector in which the machining conditions stored in the search result storage unit 17B and values of kernels corresponding thereto are arranged is k, and a scalar value obtained by adding the accuracy parameter of the evaluation value predicting unit 16a to the value of the kernel between the machining conditions x is c, the uncertainty evaluation unit 16b can calculate an index $\sigma^2(x)$ indicating the uncertainty of the prediction of the evaluation value for the untried machining condition x in accordance with Equation (5) below. In Equation (5), $C_N$ is a gram matrix. The uncertainty evaluation unit 16b may not use the Gaussian process regression, and may calculate the index by regression using density estimation, a mixed density network, and Kullback-Leibler divergence.

$$\sigma^2(x)=c-k^T \cdot (C_N^{-1})k \quad (5)$$

Figure 3:
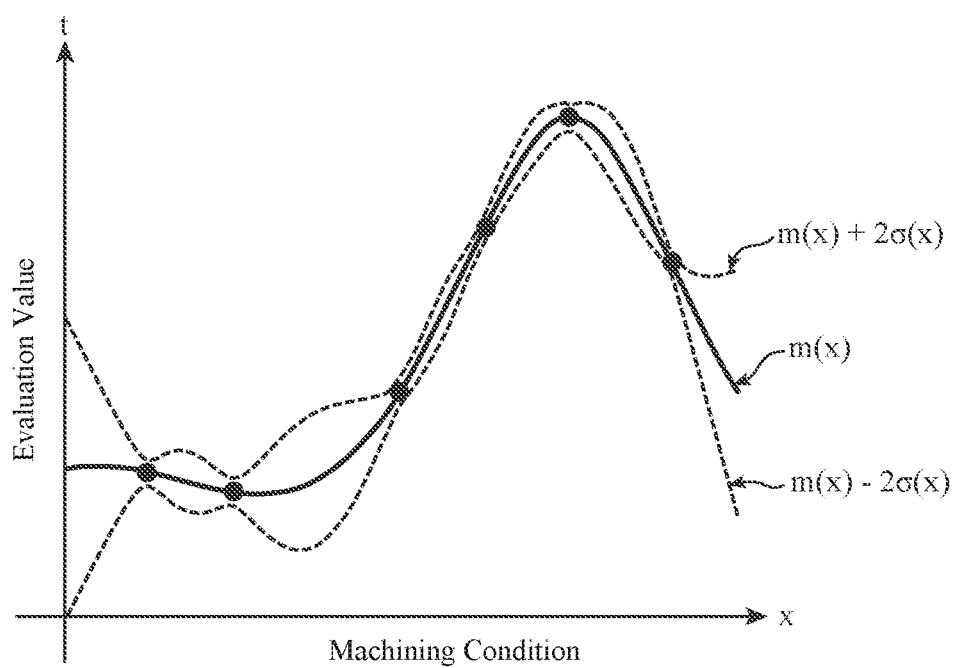
FIG. 3 is a graph illustrating a relationship among a machining condition, a predictive value of an evaluation value corresponding to the machining condition, and an index indicating uncertainty of prediction of the evaluation value.

FIG. 3 is a graph illustrating a relationship among a machining condition, a predictive value of an evaluation value corresponding to the machining condition, and an index indicating uncertainty of prediction of the evaluation value. The evaluation value prediction model 16 performs prediction on the basis of the premise that, for example, Gaussian process regression is used and the evaluation value follows the Gaussian distribution. Black plots illustrated in FIG. 3 indicate machining conditions and evaluation values stored in the search result storage unit 17B. FIG. 3 statistically indicates that, in a case where the predictive value of the evaluation value is set as an average m(x) of the Gaussian distribution and the index indicating the uncertainty of the prediction of the evaluation value is set as a standard deviation σ(x) of the Gaussian distribution, the black plots fall within a range of equal to or less than m(x)+2σ(x) and equal to or more than m(x)−2σ(x) with a probability of about 95%, even if the prediction of the evaluation value is wrong.

The search end determining unit 11c included in the machining condition generating unit 11 determines whether or not to end the search for the machining condition using the predictive value of the evaluation value of the machining condition stored in the prediction result storage unit 17D and the index indicating the uncertainty of the prediction of the evaluation value stored in the uncertainty storage unit 17E (step ST15). For example, the search end determining unit 11c compares the values of the indexes, which are stored in the uncertainty storage unit 17E and indicate the uncertainty of the prediction of the evaluation values of all the machining conditions searched so far, with a threshold value. In a case where the values of the indexes are equal to or less than the threshold value, the search end determining unit 11c determines that the optimal machining condition has been searched, and ends the search for the machining condition.

In addition, when the number of machining conditions under which the prediction of the evaluation values may greatly deviates is equal to or less than a specified number as a result of comparison between the indexes indicating the uncertainty of the prediction of the evaluation values of all the machining conditions and the threshold value, the search end determining unit 11c ends the search for the machining condition. This is because, when there is a machining condition under which the actual measurement value of the evaluation value and the predictive value of the evaluation value are greatly different, the predictive value greatly changes in a wide range of the search space of the machining condition.

For example, the search end determining unit 11c uses the machining condition x, the predictive value m(x) of the evaluation value for the machining condition x, and an index σ(x) (standard deviation) indicating the uncertainty of the prediction of the evaluation value, and can determine that, as the value of m(x)+κσ(x) increases, the significance of searching the machining condition is higher. Note that κ is a parameter determined before the search for the machining condition is started. As the value of κ is smaller, a machining condition having a higher predictive value of the evaluation value is selected, and as the value of κ is larger, a machining condition having a higher possibility of greatly deviating from the prediction of the evaluation value is selected. The same value may be continuously used as the value of κ, or the value may be changed during the processing.

When determining to end the search for the machining condition (YES in step ST15), the search end determining unit 11c extracts the machining condition predicted to have the highest evaluation value from the predictive values of the evaluation values of all the machining conditions stored in the prediction result storage unit 17D, and outputs the extracted machining condition to the actual machining instructing unit 11b. The actual machining instructing unit 11b outputs an instruction including the machining condition output from the search end determining unit 11c to the machining device 2, and sets the machining condition in the machining device 2 (step ST16).

When determining that it is necessary to additionally search for a machining condition (NO in step ST15), the search end determining unit 11c outputs continuation of the search to the machining condition calculating unit 11a. When receiving an instruction to continue the search from the search end determining unit 11c, the machining condition calculating unit 11a generates a machining condition to be tried next by using the predictive value of the evaluation value of the machining condition stored in the prediction result storage unit 17D (step ST17). The machining condition to be tried next calculated by the machining condition calculating unit 11a is output to the actual machining instructing unit 11b. The actual machining instructing unit 11b outputs an instruction including the machining condition to be tried next to the machining device 2, and sets the machining condition in the machining device 2.

When the optimal machining condition is set in step ST16 or the machining condition to be tried next is set in step ST17, the machining device 2 performs machining (step ST18). During machining by the machining device 2, the machining state collecting unit 12 collects data indicating the machining state and stores the machining condition and the machining state in association with each other in the machining state storage unit 17A. The machining result collecting unit 13 collects data indicating the machining result and outputs the data to the machining result evaluating unit 14. The machining result evaluating unit 14 calculates an evaluation value of the machining performed by the machining device 2 on the basis of the machining result collected by the machining result collecting unit 13 (step ST19). Next, the processing proceeds to the process of step ST7, and the above-described processing is executed.

The display unit 3 displays the machining condition and the evaluation value corresponding to the machining condition obtained during the search for the machining condition by the machining condition searching device 1. In addition, the display unit 3 displays the machining condition and the predictive value of the evaluation value corresponding to the machining condition, or the optimal machining condition that is the search result. That is, the display unit 3 displays at least one of: the machining condition read from the search result storage unit 17B and the evaluation value corresponding to this machining condition; the machining condition read from the prediction result storage unit 17D and the predictive value of the evaluation value corresponding to this machining condition; or the optimal machining condition that is the search result output from the machining condition calculating unit 11a. As a result, a machining worker can recognize the search situation and the search result of the machining condition by referring to the information displayed on the display unit 3.

A hardware configuration for implementing the functions of the machining condition searching device 1 is as follows.

The functions of the machining condition generating unit 11, the machining state collecting unit 12, the machining result collecting unit 13, the machining result evaluating unit 14, the model construction unit 15, and the evaluation value prediction model 16 in the machining condition searching device 1 are implemented by a processing circuit. That is, the machining condition searching device 1 includes a processing circuit that executes processes from step ST1 to step ST19 in FIG. 2. The processing circuit may be dedicated hardware, or may be a central processing unit (CPU) that executes a program stored in a memory.

Figure 4A:
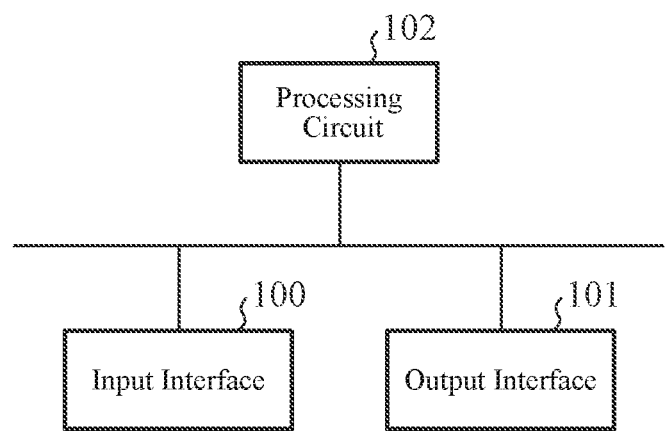
FIG. 4A is a block diagram illustrating a hardware configuration for implementing functions of the machining condition searching device according to the first embodiment.
Figure 4B:
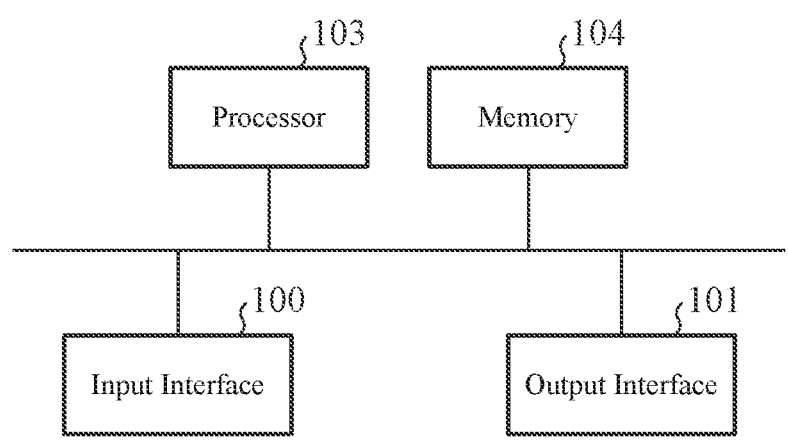
FIG. 4B is a block diagram illustrating a hardware configuration for executing software that implements the functions of the machining condition searching device according to the first embodiment.

FIG. 4A is a block diagram illustrating a hardware configuration for implementing the function of the machining condition searching device 1. FIG. 4B is a block diagram illustrating a hardware configuration for executing software that implements the function of the machining condition searching device 1. In FIGS. 4A and 4B, an input interface 100 relays data indicating the machining state and the machining result output from the machining device 2 to the machining condition searching device 1, and relays storage data output from each of the storage units 17A to 17E to the machining condition searching device 1. An output interface 101 relays information output from the machining condition searching device 1 to the display unit 3 or data output from the machining condition searching device 1 to each of the storage units 17A to 17E.

When the processing circuit is a processing circuit 102 that is dedicated hardware illustrated in FIG. 4A, the processing circuit 102 is, for example, a single circuit, a composite circuit, a programmed processor, a parallel programmed processor, an application specific integrated circuit (ASIC), a field-programmable gate array (FPGA), or a combination of some of these circuits. The functions of the machining condition generating unit 11, the machining state collecting unit 12, the machining result collecting unit 13, the machining result evaluating unit 14, the model construction unit 15, and the evaluation value prediction model 16 in the machining condition searching device 1 may be implemented by separate processing circuits, or these functions may be collectively implemented by a single processing circuit.

When the processing circuit is a processor 103 illustrated in FIG. 4B, the functions of the machining condition generating unit 11, the machining state collecting unit 12, the machining result collecting unit 13, the machining result evaluating unit 14, the model construction unit 15, and the evaluation value prediction model 16 in the machining condition searching device 1 are implemented by software, firmware, or a combination of software and firmware. Note that software or firmware is described as a program and stored in a memory 104.

The processor 103 executes the functions of the machining condition generating unit 11, the machining state collecting unit 12, the machining result collecting unit 13, the machining result evaluating unit 14, the model construction unit 15, and the evaluation value prediction model 16 in the machining condition searching device 1 by reading and executing the program stored in the memory 104. For example, the machining condition searching device 1 includes the memory 104 for storing programs to eventually execute the processes from step ST1 to step ST19 in the flowchart illustrated in FIG. 2 when the processing in the flowchart is executed by the processor 103. These programs cause a computer to execute procedures or methods performed by the machining condition generating unit 11, the machining state collecting unit 12, the machining result collecting unit 13, the machining result evaluating unit 14, the model construction unit 15, and the evaluation value prediction model 16. The memory 104 may be a computer-readable storage medium storing a program for causing a computer to function as the machining condition generating unit 11, the machining state collecting unit 12, the machining result collecting unit 13, the machining result evaluating unit 14, the model construction unit 15, and the evaluation value prediction model 16.

The memory 104 is, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a digital versatile disk (DVD).

Some of the functions of the machining condition generating unit 11, the machining state collecting unit 12, the machining result collecting unit 13, the machining result evaluating unit 14, the model construction unit 15, and the evaluation value prediction model 16 in the machining condition searching device 1 may be implemented by dedicated hardware, and some may be implemented by software or firmware. For example, the functions of the machining condition generating unit 11, the machining state collecting unit 12, the machining result collecting unit 13, the machining result evaluating unit 14, and the model construction unit 15 are implemented by the processing circuit 102 that is dedicated hardware, and the function of the evaluation value prediction model 16 is implemented by the processor 103 reading and executing the program stored in the memory 104. As described above, the processing circuit can implement the above-mentioned functions by hardware, software, firmware, or a combination thereof.

As described above, in the machining condition searching device 1 according to the first embodiment, the evaluation value corresponding to the untried machining condition is predicted on the basis of the machining condition set in the machining device 2, the machining state, and the evaluation value of machining, the evaluation value prediction model 16 is constructed on the basis of a degree of change in the relationship between the machining condition and the evaluation value, and weighting based on the machining state is performed on the evaluation value prediction model 16. Even when the relationship between the machining condition and the evaluation value changes due to a change in the machining state, the evaluation value prediction model 16 is newly constructed on the basis of the degree of the change, and weighting based on the machining state is performed on the evaluation value prediction model 16. Thus, the machining condition searching device 1 can search for the machining condition without constructing a learning model by collecting a large amount of data in advance, even when the relationship between the machining condition and the evaluation value thereof changes due to a change in the machining state. In addition, the machining condition searching device 1 does not sequentially search for a large number of machining conditions that can be set in the machining device 2, but narrows down the number of machining conditions to be searched depending on a change in the machining state, so that the number of attempts to search for machining conditions is reduced.

It is to be noted that any components in the embodiment can be modified or omitted.

INDUSTRIAL APPLICABILITY

The machining condition searching device according to the present disclosure can be used to search for machining conditions of an electrical discharge machine, for example.

REFERENCE SIGNS LIST

1: machining condition searching device, 2: machining device, 3: display unit, 11: machining condition generating unit, 11a: machining condition calculating unit, 11b: actual machining instructing unit, 11c: search end determining unit, 12: machining state collecting unit, 13: machining result collecting unit, 14: machining result evaluating unit, 15: model construction unit, 16: evaluation value prediction model, 16a: evaluation value predicting unit, 16b: uncertainty evaluation unit, 17A: machining state storage unit, 17B: search result storage unit, 17C: model storage unit, 17D: prediction result storage unit, 17E: uncertainty storage unit, 100: input interface, 101: output interface, 102: processing circuit, 103: processor, 104: memory

The invention claimed is:

1. A machining condition searching device comprising processing circuitry
    to perform generation of a machining condition to be set in a machining device,
    to perform collection of a machining state indicating each of a state of the machining device that performs machining in accordance with the machining condition, a state of a workpiece to be machined, and a state of an installation environment of the machining device,
    to perform collection of a machining result of the machining performed in accordance with the machining condition,
    to perform calculation of an evaluation value of the machining performed in accordance with the machining condition on a basis of the machining result collected by the collection of the machining result,
    to perform prediction of the evaluation value corresponding to the machining condition that has not been tried on a basis of the machining condition generated by the generation, the machining state collected by the collection of the machining state, and the evaluation value calculated by the calculation, and
    to perform construction of the at least one evaluation value prediction model in a case where a degree of change in the machining state is equal to or greater than a threshold value, and perform weighting based on the machining state on the at least one evaluation value prediction model, wherein
    the processing circuitry generates the machining condition to be tried next, using a predictive value of the evaluation value obtained by the prediction, and
    the machining condition searching device repeatedly performs each of processes performed by the collection of the machining state, the collection of the machining result, the calculation, the prediction, the construction, and the weighting until searching of the machining condition is determined to end.

2. The machining condition searching device according to claim 1, wherein the processing circuitry further performs
    to calculate an index indicating uncertainty of the prediction of the evaluation value on a basis of the machining condition and the machining state, and to generate the machining condition to be tried next on a basis of the predictive value of the evaluation value and the index indicating the uncertainty of the prediction of the evaluation value.

3. The machining condition searching device according to claim 2, wherein
the processing circuitry determines whether or not to end the searching using the predictive value of the evaluation value and the index indicating the uncertainty of the prediction of the evaluation value, and when determining to end the searching, predicts the machining condition that is optimal on a basis of only the predictive value of the evaluation value without considering the uncertainty of the prediction of the evaluation value.

4. The machining condition searching device according to claim 2, wherein
the at least one evaluation value prediction model is a probability model of the machining condition corresponding to the evaluation value constructed assuming that the evaluation value corresponding to the machining condition is a random variable, and the at least one evaluation value prediction model calculates the predictive value of the evaluation value and the index indicating the uncertainty of the prediction of the evaluation value.

5. The machining condition searching device according to claim 1, further comprising a display that displays at least one of: the machining condition and the evaluation value corresponding to the machining condition; the machining condition and a predictive value of the evaluation value corresponding to the machining condition; or the machining condition that is a result of the searching.

6. The machining condition searching device according to claim 1, wherein the processing circuitry constructs an evaluation value prediction model by performing linear interpolation to a plurality of evaluation value prediction models included in the at least one evaluation value prediction model.

7. A machining condition searching method comprising:
performing generation of a machining condition to be set in a machining device;
performing collection of a machining state indicating each of a state of the machining device that performs machining in accordance with the machining condition, a state of a workpiece to be machined, and a state of an installation environment of the machining device;
performing collection of a machining result of the machining performed in accordance with the machining condition;
performing calculation of an evaluation value of the machining performed in accordance with the machining condition on a basis of the machining result collected by the collection of the machining result;
performing prediction of the evaluation value corresponding to the machining condition that has not been tried on a basis of the machining condition generated by the generation, the machining state collected by the collection of the machining state, and the evaluation value calculated by the calculation;
performing construction of the at least one evaluation value prediction model in a case where a degree of change in the machining state is equal to or greater than a threshold value, and performing weighting based on the machining state on the at least one evaluation value prediction model; and
generating the machining condition to be tried next, using a predictive value of the evaluation value obtained by the prediction performed by the at least one evaluation value prediction model, and
each of the processes performed by the collection of the machining state, the collection of the machining result, the calculation, the prediction, the construction, and the weighting is repeatedly performed until searching of the machining condition is determined to end.

* * * * *